3,558,399
PROCESS FOR HEAT SEALING SARAN
COATED POLYOLEFIN FILM
George W. Turner, Miami, Fla., assignor to Arnold Cellophane Corporation, Miami, Fla., a corporation of Florida
No Drawing. Filed Mar. 6, 1968, Ser. No. 710,731
Int. Cl. C09j 5/02
U.S. Cl. 156—308                          3 Claims

ABSTRACT OF THE DISCLOSURE

There is provided a process for heat sealing saran coated polyolefin film comprising coating the film with at least one sealable coating and heat sealing the film. The preferred sealable coatings are formulated with polymers selected from ethylene vinyl acetate and acrylates, terpene resins, coumarone indene resins, butadiene/styrene latex and mixtures thereof. Further, the preferred formulations contain 1% to 40% wax.

---

This invention relates to a method for heat sealing plastic films, particularly to a method for heat sealing polyolefin films having a coat of saran thereon.

Polyolefins, e.g., polyethylene and polypropylene, have become very important for packaging foodstuffs such as bakery products, potato chips, and the like. These films exhibit good clarity, high impact strength and tear resistance. However, these films are particularly difficult to heatseal, especially in connection with modern high speed packaging equipment. Further, for many foodstuffs that are adversely affected by moisture, e.g., potato chips, it has been necessary to coat these films with a moisture barrier composition, such as saran, since these films have a moisture transmission rate which is too high for satisfactory packaging of such foods. Saran is a vinylidene chloride composition which may also contain vinyl chloride, for example, in a ratio of about 85–15, respectively. Portions outside of this range may, however, be used, e.g., 80/20 to 90/10. Polyolefin films coated with saran are especially well suited for commercial production of packaging containers due to the improved processing properties of slip, block, etc., provided by the coating.

However, the saran coated polyolefin films suffer from a major disadvantage in that the heat sealing temperature at which a reproducible and acceptable heat sealing may be accomplished is rather narrow, e.g., 290–310° F. While this narrow temperature range does not greatly affect low volume production of heat sealed film, it is a difficult problem when high volume production is necessary. In particular, in the production of potato chip bags it is necessary that the bags be produced in large volume with a minimum of difficulty in order that the resulting product may be sold at a competitive price. In this situation, a significant percentage of poorly formed heat seals result in an uneconomical process. The prior art has attempted to overcome the problem of the narrow heat sealing range by extremely close control of film thickness, die temperatures and sealing time. However, these critical factors are very difficult to continuously control and have resulted in a significant percentage of poorly formed sealings. For example, with saran-coated polyethylene the heat seal strength produced at 200° F. is nil, at 250° F. is only 3 grams and at 300° F. is only 12 grams.

It is, therefore, the object of the present invention to provide a process for heat sealing of polyethylene and polypropylene films having a coating of saran thereon which does not require carefully controlled temperatures, film thickness and sealing times or stripping of the saran coating. It is a further object of this invention to provide a process wherein such films may be heat sealed continuously or intermittently and in large volumes per unit time and wherein a uniform and reproducible seal of good quality is obtained. Another object of the invention is to provide a process for producing containers for foodstuffs, such as potato chips, which containers may be produced in large quantities without a significant proportion of improperly formed heat seals.

Broadly stated, the present invention provides a process wherein polyolefin films having a saran coating thereon are further coated, at least in the area where a heat seal is to be placed, with at least one coating which has a wide temperature range suitable for heat sealing.

The polyolefin film used in the present invention may be either low, medium or high index material and may be either unoriented, or uniaxially or biaxially oriented. The specific physical properties of the films are not critical. The saran coating on the film may be in any desired thickness but typically from about 0.1 to 0.3 mil, or stated another way, from as low as 0.5 lb. to 10 lbs. per ream is suitable. A ream is equivalent to 500 sheets of 24 x 36 inches. The particular method of heat sealing is unimportant and may be accomplished by the known methods of layup, foldover or rolled seal. The heat may be applied via an intermittent impulse, dielectric or ultrasonic device. All of these seals and methods of heating are well known in the art and further elaboration in this specification is not necessary. For further details see Farkas, "Heat Sealing," Reinhold Publishing Co., New York (1964), which disclosure is incorporated herein by reference.

The heat sealable coating and/or coatings placed on the saran-coated polyolefin may cover the entire film or only the areas where heat sealing is to take place. As will be appreciated, it is only necessary that the coating be in the areas which are to be heat sealed, but if desired any further areas or the entire areas of the films may be coated. The coated thickness is not critical but will normally vary between 0.5 lb. and 5.0 lbs. per ream. Any desired method may be used for coating the films, such as a "kiss roller," doctor blade, immerging, spraying, casting, printing, brushing, etc. The particular method of applying the coating is not critical, and it is only necessary that it be applied in the above-noted thicknesses and in the areas where heat sealing is to take place. The coatings may be applied either as a hot melt, a solution or dispersion.

In general, the coating compositions, hereinafter referred to as sealable coatings, may be chosen from the following polymers of ethylene vinyl acetate, synthetic rubbers such as GR–S, GR–M, GR–I and GR–N, vinyl copolymers such as vinyl acrylonitrile, vinyl pyrrolidone/ vinyl acetate, phenolics, butadiene/styrene/acrylonitrile, polyvinyl alcohol/acetates, melamines, polyamides such as the versamide resins, ethylene vinyl acrylates, terpene resins, coumarone indene resins, butadiene/styrene latex, and mixtures of the foregoing. The polymers are advantageously compounded with microcrystalline or paraffin wax.

The preferred coating compositions, however, are those of wax, ethylene vinyl acetate and/or ethylene vinyl acrylate and more preferably with terpene resin and/or coumarone indene resins. Another excellent composition is ethylene vinyl acetate, wax, terpene resin, and butadiene/ styrene latex. With the above compositions seal strengths of up to 700 grams may be obtained at sealing temperatures of 175° to 325° F. although lower and higher temperatures may be used by respectively compounding with major and minor amounts of wax. In general the wax content should be from about 1% to 40% with the remainder being the polymer or mixture of polymers. For example, the following proportions of the preferred compositions are suitable for most applications:

COMPOSITION A

| Ingredient: | Parts by weight |
|---|---|
| Paraffin wax and/or microcrystalline wax | 1–40 |
| Ethylene vinyl acetate and/or ethylene vinyl acrylate | 20–70 |
| Terpene resin | 3–20 |
| Coumarone indene resin | 2–20 |

COMPOSITION B

| Ingredient: | Parts by weight |
|---|---|
| Paraffin wax and/or microcrystalline wax | 1–40 |
| Terpene resin | 10–30 |
| Ethylene vinyl acetate | 15–40 |

COMPOSITION C

| Ingredient: | Parts by weight |
|---|---|
| Paraffin wax and/or microcrystalline wax | 1–40 |
| Ethylene vinyl acetate | 30–70 |
| Terpene resin | 10–40 |

As can be seen from the above representative formulations, the proportions of ingredients may be varied considerably and adjusted to provide a wide range of sealing temperatures. In general, specific formulations can be easily obtained by mixing the various ingredients in a few different proportions and testing the formulations for acceptable heat sealing strength. This will quickly lead one skilled in the art in the proper direction of the various proportions and to an optimum formulation. For example, if the heat seal temperature range is broader than necessary, but the seal strength is less than desired, a decrease in the amount of wax is indicated. If greater tackiness is desired, greater amounts of the more tacky resins are indicated. The above sealable coatings will provide heat sealing ranges of from 175° F. to 325° F.

With the present invention a saran coated polyolefin film having the sealable coating therein can be processed under greater fluctuating and varying conditions than was possible heretofore, while yet obtaining a repeatable and satisfactory heat seal. For example, when using the prior art method of heat sealing saran coated polypropylene, if the film thickness varies by as much as 10% the resulting temperature difference actually obtained at the interface of the films to be sealed would be too great to accomplish a reproducible sealing. Similarly, if the temperature of the seal die varies by more than 10° F. from the midpoint of the sealing range an improper seal would be obtained. Likewise, if the speed of the film passing over the sealing die fluctuates by as much as 10% an improper or nonreproducible seal would be obtained. With the present process, the temperature may vary widely, e.g., up to 25° F. or slightly more from the midpoint of the sealing range. The film thickness may vary considerably, e.g., plus or minus 20 % without adverse effects and the speed of the film passing over the sealing die may vary plus or minus 25%, while still effecting reproducible and proper heat sealing.

The invention is illustrated by the following examples, but it is to be understood that the invention is not restricted thereto and that the invention is applicable to the extent and scope of the annexed claims. In the examples all proportions are by weight unless otherwise identified.

EXAMPLE 1

A polypropylene film of 1 mil thickness and having a saran coating thereon of 5 lbs. per ream was heat sealed continuously and formed into potato chip bags. The heat seal was accomplished on a conventional machine in which the film was passed over a resistance heated die. The electrical input to the die was adjusted to provide a die operation temperature of 295° F. of a constant rate of production of 100 bags per minute. The film utilized in this example was purchased from a commercial supplier and is readily available on the market. During the processing of 1000 feet of film, 3% of the seals were improperly formed due to uncontrollable fluctuations, e.g., film thickness, die temperature, saran coating thickness and speed of the film across the die. A further 1000 feet of the same film was coated with a heat sealable coating according to the invention by means of a "kiss roller" and dried by passing through a 160° F. hot air oven. This 1000 feet of film was formed into bags with the conventional machine and under the same conditions, i.e., temperature, film speed, as noted above in connection with the prior art film. Only 0.1% of the so formed seals were improper. The coating was of the following composition:

| Ingredients: | Parts by weight |
|---|---|
| Microcrystalline wax | 25 |
| Ethylene vinyl acetate of mixed molecular weights | 50 |
| Terpene resin | 25 |

The composition was prepared by mixing the ingredients in an equal weight of V & M & P naptha while warming to 120° F.

EXAMPLES 2 AND 3

The procedure of Example 1 was repeated with the following compositions:

2.5 parts paraffin wax, 20 parts microcrystalline wax, 35 parts ethylene vinyl acetate, 15 parts ethylene vinyl acrylate, 15 parts terpene resin and 10 parts coumarone indene resin.

3.5 parts butadiene/styrene latex, 20 parts terpene resin, 20 parts microcrystalline wax, 10 parts paraffin wax and 25 parts ethylene vinyl acetate.

Both compositions were dissolved in naphtha and coated as in Example 1. Similar results regarding the number of improper seals were obtained.

The particular solvents used in coating the formulations are not important and may be chosen as desired. Suitable solvents include the lower alkanols, e.g., up to 8 carbon atoms such as methanol, ethanol, n-propanol, iso-propanol, and lower alkyl acetates, e.g., up to 9 carbon atoms such as ethyl acetate, hexyl acetate and methyl acetate.

I claim:
1. A process for heat sealing saran coated polyolefin film comprising coating on the said film at least in the areas to be sealed, at least one sealable coating consisting essentially of (1) a wax selected from the group consisting of paraffin wax and microcrystalline wax and mixtures thereof; (2) a polymer selected from the group consisting of ethylene vinyl acetate and ethylene vinyl acrylate and mixtures thereof; and (3) terpene resin and heat sealing the film at temperatures between 175° F. and 325° F.
2. The process of claim 1 wherein the coating is applied in a thickness of between 0.5 lb. and 5.0 lbs. per ream.
3. The process of claim 1 wherein the sealable coating also contains at least one member selected from the group consisting of coumarone indene resins and butadiene/styrene latex.

References Cited

UNITED STATES PATENTS

| 2,496,963 | 2/1947 | Snyder | 156—308 |
| 2,563,316 | 8/1951 | De Sylva | 156—306 |
| 3,293,111 | 12/1966 | McCormick | 156—332 |
| 3,445,324 | 5/1969 | Curler et al. | 161—254X |
| 3,459,591 | 8/1969 | Konishi et al. | 161—254X |

REUBEN EPSTEIN, Primary Examiner

U.S. Cl. X.R.

161—254; 156—306, 333